(12) United States Patent
Pfeifer

(10) Patent No.: US 10,713,974 B2
(45) Date of Patent: Jul. 14, 2020

(54) DISPLACEMENT TRANSDUCER ARRANGEMENT AND CRASH TEST DUMMY

(71) Applicant: Gerhard Pfeifer, Johannesberg (DE)

(72) Inventor: Gerhard Pfeifer, Johannesberg (DE)

( * ) Notice: Subject to any disclaimer, the term of this patent is extended or adjusted under 35 U.S.C. 154(b) by 275 days.

(21) Appl. No.: 15/745,183

(22) PCT Filed: Jul. 13, 2016

(86) PCT No.: PCT/DE2016/000271
§ 371 (c)(1),
(2) Date: Jan. 16, 2018

(87) PCT Pub. No.: WO2017/008778
PCT Pub. Date: Jan. 19, 2017

(65) Prior Publication Data
US 2018/0211567 A1 Jul. 26, 2018

(30) Foreign Application Priority Data

Jul. 15, 2015 (DE) .................. 10 2015 008 910
Jul. 26, 2015 (DE) .................. 10 2015 009 393

(51) Int. Cl.
*A63F 9/24* (2006.01)
*G09B 23/32* (2006.01)
(Continued)

(52) U.S. Cl.
CPC ............... *G09B 23/32* (2013.01); *G01B 3/06* (2013.01); *G01B 5/14* (2013.01); *G01D 5/16* (2013.01);
(Continued)

(58) Field of Classification Search
CPC . G09B 23/32; G01B 3/06; G01B 5/14; G01D 5/16; G01D 5/165
See application file for complete search history.

(56) References Cited

U.S. PATENT DOCUMENTS 5,987,779 A * 11/1999 Litchfield ............ A43B 13/203
36/29
2005/0018205 A1 1/2005 Braasch
(Continued)

FOREIGN PATENT DOCUMENTS

DE   10 2010 019 656 A1   11/2011
DE      102010019656 A1   11/2011
(Continued)

OTHER PUBLICATIONS

Geokon, "Scissor-Jack" Crackmeter, 2010, p. 1, at https://www.geokon.com/4420-1X-50, (last visited Dec. 11, 2019). (Year: 2010).*
(Continued)

*Primary Examiner* — Steve Rowland
(74) *Attorney, Agent, or Firm* — Nexsen Pruet, LLC; Todd A. Serbin

(57) ABSTRACT

The invention relates to a displacement transducer arrangement for measuring intrusions in a crash test dummy, having a first mounting and a second mounting, wherein a distance between the first mounting and the second mounting is variable, wherein there is a displacement transducer for measuring the distance (D) between the first mounting and second mounting, wherein the first mounting and second mounting are connected to each other by a scissor lift mechanism. The invention further relates to a crash test dummy.

20 Claims, 6 Drawing Sheets

(51) Int. Cl.
*G01B 5/14* (2006.01)
*G01B 3/06* (2006.01)
*G01D 5/16* (2006.01)
*G01D 5/165* (2006.01)
*G01M 17/007* (2006.01)

(52) U.S. Cl.
CPC ......... G01D 5/165 (2013.01); *G01M 17/0078* (2013.01)

(56) References Cited

U.S. PATENT DOCUMENTS

| | | | |
|---|---|---|---|
| 2005/0206910 A1 | 9/2005 | Schroeder | |
| 2007/0058163 A1* | 3/2007 | Handman | G01C 3/22 356/152.1 |
| 2007/0279643 A1* | 12/2007 | Elhagediab | G01B 11/16 356/614 |
| 2011/0130111 A1* | 6/2011 | Crandall | B60R 21/013 455/404.1 |
| 2015/0122043 A1* | 5/2015 | Xu | G01L 1/005 73/767 |
| 2015/0216247 A1* | 8/2015 | Price | A42B 3/125 2/414 |

FOREIGN PATENT DOCUMENTS

| | | |
|---|---|---|
| DE | 10 2013 106 703 A1 | 12/2014 |
| DE | 102013106703 A1 | 12/2014 |

OTHER PUBLICATIONS

James H. McElhaney and Peter I. Mate, "A New Crash Test Device—Repeatable Pete", p. 467-507 1973.
Maier, Nikolaus; German Examination Report; 4 pages; DE 10 2015 009 393.2; dated Mar. 15, 2016.
Kaiser, Jean-Luc; International Search Report; 6 pages; PCT/DE2016/000271; dated Oct. 28, 2016.
McElhaney, James H.; "Crash test device development; Repeatable Pete", 163 pages, Jun. 30, 1973.
Rouhana, Stephen W.; "A High-Speed Sensor for Measuring Chest Deflection in Crash Test Dummies", General Motors Global Research and Development Operations, Aerotek Lab Support, 29 pages, Jun. 30, 1998.

* cited by examiner

DISPLACEMENT TRANSDUCER ARRANGEMENT AND CRASH TEST DUMMY

RELATED APPLICATIONS

This application is a U.S. national phase application, claiming priority under 35 U.S.C. 371 to PCT application PCT/DE2016/000271, filed on Jul. 13, 2016, claiming priority to German national application 10 2015 008 910.2, filed on Jul. 15, 2015 and German national application 10 2015 009 393.2, filed on Jul. 26, 2015, the contents of the these applications incorporated by reference as if fully set forth herein in their entirety.

FIELD AND BACKGROUND OF THE INVENTION

Crash test dummies are used in the automotive industry for practical testing of the driving safety of vehicles. A large number of different standardized tests are required for the approval of new vehicles. These tests provide for a frontal crash without offset, frontal crashing with partial offset, side crashing, and the like. The tests are carried out with the vehicle for which approval is being sought using at least one crash test dummy that is sitting therein. Crash test dummies simulate human beings during the tests and use a complex sensor system to record the influences of the impact acting on them. For instance, acceleration sensors are commonly placed at numerous points, such as in the head and chest. Moreover, force sensors are often used which measure the profiles of the forces acting on individual body parts, such as the knee, abdomen, thorax, cervical spine, and the like.

One of the critical factors that poses a health hazard during a collision is chest intrusion during the impact. Crash test dummies are equipped with artificial ribs that simulate human rib cages. The intrusion of human ribs can be so extreme in a side impact, for example, that ribs break, which can pose a danger for the underlying organs in some circumstances. In order to measure intrusions in such crash tests, displacement transducer arrangements are known in the prior art that are arranged on the spinal column of the crash test dummy on the one hand and on the rib cage on the other.

A great number of requirements are placed on the displacement transducer arrangements. They must be able to measure the distances precisely but also sufficiently quickly in order to detect the dynamics of the intrusion, since they, in addition to the absolute values, have a substantial influence on the human occupants' risk of injury. The displacement transducer arrangements must be able to perform measurements at up to 18 m/s.

One known displacement transducer arrangement, which is explained in conjunction with FIG. 7, provides for an arrangement of sleeves that can be displaced relative to one another between a first mounting on the spinal column and a second mounting on the rib cage. A light source, such as an IR LED, for example, is provided in the interior of the sleeve arrangement that emits to a sensor that is provided on the other mounting. The amount of light that arrives at the sensor determines the distance between light source and sensor, so that the luminance is a measure of distance. The use of this arrangement requires that a power supply be provided on both mountings, which is achieved in the prior art by means of a cable that is routed outside of the sleeves. This cable can be easily damaged, which renders the displacement transducer arrangement useless. What is more, the mutually displaceable sleeves can be displaced haphazardly relative to one another as a result of a change of distance caused by an intrusion, which results in a haphazard sleeve configuration at a given distance between the two mountings. This causes variances in the measured light signal, since the sleeve walls are light-reflective, and the sum of all light paths for different sleeve configurations result in different brightnesses at the receiver. In addition, light sources and sensors require a relatively high amount of energy, so that a comparatively high-energy power supply is needed. The supply voltage is 5 V, whereas conventional instrumentation amplifiers in crash test dummies operate at 2.5 V to 3.3 V. Special solutions are therefore required for the power supply. The residual heat of the instrumentation amplifier and of the light slowly heats up the displacement transducer arrangement and the crash test dummy, which has an impact on the dark current of the sensor. The measurement accuracy thus depends on the temperature of the displacement transducer arrangement. Furthermore, the temperature of the crash test dummy is defined during the measurement. What is more, the calibration of such displacement transducer arrangements is difficult due to the abovementioned circumstances. The sensor also delivers a nonlinear voltage signal that must be subsequently linearized. To achieve this, the zero position of the sensor must be known. The measurement accuracy increases as a result of the subsequent linearization. What is more, the signal-to-noise ratio becomes unfavorable at large distances to the light source.

Moreover, displacement transducer arrangements are known that work with string potentiometers. These have low limits in terms of the speeds that can be achieved. At speeds of greater than 4 m/s, the cable can slacken, which distorts the measuring results.

Rod potentiometers are known as well, but, due to their construction, they make only half of the maximum length available as a measured distance. Its maximum travel speed is 10 m/s.

DETAILED DESCRIPTION OF EMBODIMENTS OF THE INVENTION

Figure 1:
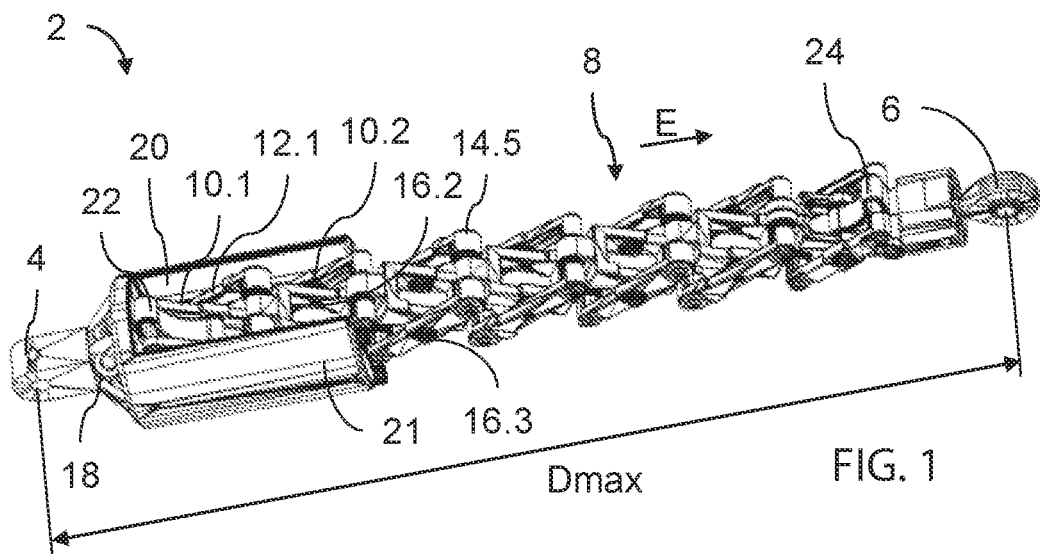
FIG. 1 shows a perspective representation of a displacement transducer arrangement in an extended position.

It is therefore the object of the invention to provide a displacement transducer arrangement of the type mentioned at the outset whose design is such that it can measure an intrusion in a crash test dummy precisely with a very low energy requirement.

The displacement transducer arrangement described in the following is used for the measurement of intrusions in a crash test dummy. Such intrusions can be relevant particularly in relation to rib cages. The displacement transducer arrangement has a first mounting and a second mounting. The first mounting can be provided on a spinal column of a crash test dummy, for example, and the second mounting can be arranged on the rib cage. The displacement transducer arrangement is embodied such that a distance between a first mounting and a second mounting can be changed.

In addition, a displacement transducer for measuring the distance between first mounting and second mounting is provided. Furthermore, a provision is made that first mounting and second mounting are interconnected via a scissor-jack mechanism. A given scissor-jack mechanism always has an unambiguously defined state when there is a given distance between a first end and a second end of the scissor-jack mechanism. This unambiguously defined state eliminates possible inaccuracies in the measurement due to arrangements that do not have any clear correlation between length and specific configuration, like in sleeve arrangements that are known in the prior art, for example. Scissor-jack mechanisms can also have a long stroke, so that the characteristics of known sleeve arrangements can be simulated.

In a first continuative embodiment, the displacement transducer can be embodied as a rotary potentiometer. Scissor-jack mechanisms are swiveled about relative fixed points of their scissor arms, so that a clear correlation exists between the total length of the scissor-jack mechanism and the angle of the individual scissor arm to a reference. The angle measured there can thus be reflected in the length, so that a rotary potentiometer that is appropriately coupled with such a relative fixed point can measure values that have an unambiguous relationship with the angle. However, a calculation by means of trigonometric functions is also required in order to determine the linear intrusion.

In an alternative embodiment, the displacement transducer can be embodied as a string potentiometer. Known displacement transducer arrangements with string potentiometers have the limitations cited at the outset. The use of a scissor-jack mechanism enables the coupling of the cable to be pulled out with a center pin whose stroke is shorter than the total stroke, but with the stroke of the center pin being in an unambiguous relationship with the total stroke. In this way, the cable speed can be reduced as a function of the transmission ratio, and greater speeds can be measured than with known string potentiometers.

In an alternative embodiment, the displacement transducer can be embodied as a linear potentiometer. Scissor-jack mechanisms have hinges that move only axially. The position of one of these hinges is thus representative of the total length of the scissor-jack mechanism. Through the use of linear potentiometers, relatively long measurement strokes can be implemented, thereby increasing the reading accuracy of the potentiometer.

Both rotary potentiometers and linear potentiometers can be operated with very little energy. The power supply of such linear potentiometers can therefore be very small. A separate power supply for the displacement transducer arrangement within the crash test dummy, as is necessary for known displacement transducer arrangements, can be omitted. What is more, such potentiometers do not heat up significantly during operation due to their low energy intake. Thermal radiation into the crash test dummy is thus prevented. The precision of such potentiometers and the temporal resolution that is possible are sufficient in order to satisfy the stringent tolerance requirements placed on sensors for crash testing.

In a possible development, the linear potentiometer can be a wiper potentiometer. Such wiper potentiometers can be contacted laterally, which reduces the required installation space for the displacement transducer.

In another, continuative embodiment, a provision can be made that a wiper contact of the linear potentiometer is connected in a nonpositive, frictional, or integral manner to the scissor-jack mechanism. In this way, the wiper contact of the linear potentiometer is moved together with the scissor-jack mechanism, so that the position of the wiper contact is relevant for the distance between first mounting and second mounting of the displacement transducer arrangement. The wiper contact can be connected directly to the scissor-jack mechanism.

In one embodiment, the wiper contact can then have a receptacle into which parts of the scissor-jack mechanism engage in order to move the receptacle and hence the wiper contact together with the scissor-jack mechanism.

In one embodiment, the corresponding coupling between wiper contact and scissor-jack mechanism takes place in an area in which the scissor-jack mechanism is moved only linearly, for example on a center pin.

The site of the coupling of the wiper contact with the scissor-jack mechanism can be chosen on the basis of various parameters, such as the stroke of the scissor-jack mechanism or the length of the scissor arms, the number of pairs of scissor arms, and the length of the wiper contact, for example. In some embodiments, a coupling can be provided on the first center pin; in other embodiments, coupling can be provided on the second, third, or an even more remote center pin.

In another, continuative embodiment, the linear potentiometer can be arranged in the direction of extension between first mounting and second mounting to the side of the scissor-jack mechanism. Such an arrangement of the linear potentiometer makes a very compact construction of the displacement transducer arrangement possible. What is more, the use of linear potentiometers simplifies the determination of the corresponding current configuration of the scissor jack mechanism.

In another, continuative embodiment, the scissor-jack mechanism can have a plurality of adjacently arranged scissor arms that can be folded in and out. The maximum distance between first mounting and second mounting then depends on the number of scissor arms, the length thereof, and the maximum relative angle thereof in relation to one another. The use of a plurality of such scissor arms that are coupled to one another in a row, makes a spatially compact construction possible that is compatible with the conditions inside a crash test dummy.

In a continuative embodiment, the scissor arms can have contact surfaces. These contact surfaces can be contacted by contact surfaces of adjacent scissor arms, thus enabling a relatively large-surface transmission of force between first mounting and second mounting in the event of a substantial intrusion. The damaging of the mechanics of the displacement transducer arrangement can thus be prevented.

In another, continuative embodiment of the displacement transducer arrangement, the first mounting can be swivelable about at least one pivot. Evasive movements of the rib cage can thus also be measured. The first mounting can also be swivelable about two pivot pins, particularly mutually perpendicular pivots, which further increases the measurement accuracy.

In some embodiments, the second mounting can also be swivelable about one or two pivots.

A first independent aspect relates to a crash test dummy with at least one displacement transducer arrangement of the aforedescribed type. Such a crash test dummy can measure intrusions very precisely both in terms of the absolute values and with respect to the dynamics. Moreover, a low-energy power supply is sufficient to operate the corresponding sensor system.

In the following exemplary embodiments, components that are the same or have a similar effect are provided with the same reference symbols for the sake of better readability.

A displacement transducer arrangement for measuring an intrusion in a crash test dummy as well as a commensurately equipped crash test dummy will be described below. The distance sensor has a first mounting and a second mounting, with a distance between first mounting and second mounting being changeable and measurable.

FIG. 1 shows a schematic, perspective view of a displacement transducer arrangement 2.

The displacement transducer arrangement 2 has a first mounting 4 and a second mounting 6. The first mounting 4 is used for arrangement on a spinal column on the interior of a crash test dummy (not shown). The second mounting 6 is used for arrangement on a rib cage of a crash test dummy.

A scissor-jack mechanism 8 is provided between first mounting 4 and second mounting 6. The scissor-jack mechanism has a plurality of scissor arms 10, 12, of which only selected individual scissor arms 10.1, 10.2, 12.1, 12.2 are provided with reference symbols in the interest of greater clarity. The scissor arms 10.1, 10.2, ..., 12.1, 12.2, ... are designated collectively by 10, 12. The scissor arms 10 and 12 are each interconnected by means of hinges 14 and center pins 16, of which likewise only individual hinges 14.1, 14.2, ..., 16.1, 16.2, 16.3 ... are provided with reference symbols for the sake of greater clarity. The scissor arms 10.1, 10.2, ..., together with the hinges 14 and center pins 16, form a scissor arm chain, and the scissor arms 12.1, 12.2 form a scissor arm chain that is parallel thereto. The hinges 14 and center pins 16 are backlash-free or, particularly, have little play.

As is shown in the subsequent FIGS. 2 to 6, first mounting 4 and second mounting 6 can be moved by means of the scissor-jack mechanism 8 to different distances D between first mounting 4 and second mounting 6. For this purpose, the scissor arms 10, 12 are moved toward one another in a well-defined manner. Thus, a specific position of the corresponding scissor arms 10, 12 corresponds to each distance D. FIG. 1 shows a maximum distance Dmax.

The first mounting 4 has a base 18 on which the scissor-jack mechanism 8 is fixed. In addition, a wiper potentiometer 20 is positioned on the base 18. The wiper potentiometer 20 has a wiper contact (not visible) that is connected frictionally to the scissor-jack mechanism 8 via one of the center pins 16, here the center pin 16.1 (see FIG. 2), so that the corresponding wiper contact, along with the center pin, is moved together with the corresponding center pin 16 in the direction of extension E. The position of the center pin 16 is thus proportional to the respective distance D of the first mount 4 and second mount 6.

Instead of a frictional connection, the wiper contact can also be coupled in another way with the center pin—fastened thereto, for example.

Instead of the center pin 16.1, the wiper contact can be connected in other embodiments to another center pin, such as the center pin 16.2.

The stroke at the wiper potentiometer 20 depends on the selection of the coupled center pin 16.1, 16.2, ... but is always proportional to the total stroke, so that a multiplication of the corresponding stroke by an appropriate factor yields the total length of the scissor-jack mechanism 8. The addition of corresponding constants for the respective axial expansion of first mounting 4 and second mounting 6 then yields the total length D.

The displacement transducer arrangement 2 can be calibrated as an overall measurement chain whereby a relationship is established between the output voltage of the wiper potentiometer and the total length of the displacement transducer arrangement 2. Any nonlinearities can be identified and analyzed.

The wiper potentiometer 20 can be supplied with power and read via a cable (not shown).

The wiper potentiometer 20 can be wired as a voltage divider in a Wheatstone bridge.

A collar 21 projects in the direction of extension E away from the base 18 of the first mounting 4.

First mounting 4 and second mounting 6 can be embodied such that the displacement transducer arrangement 2 can be swiveled in directions perpendicular to the direction of extension E. Corresponding evasive movements of the rib cage can thus be measured as well. The corresponding swiveling can be detectable by means of sensors.

Figure 2:
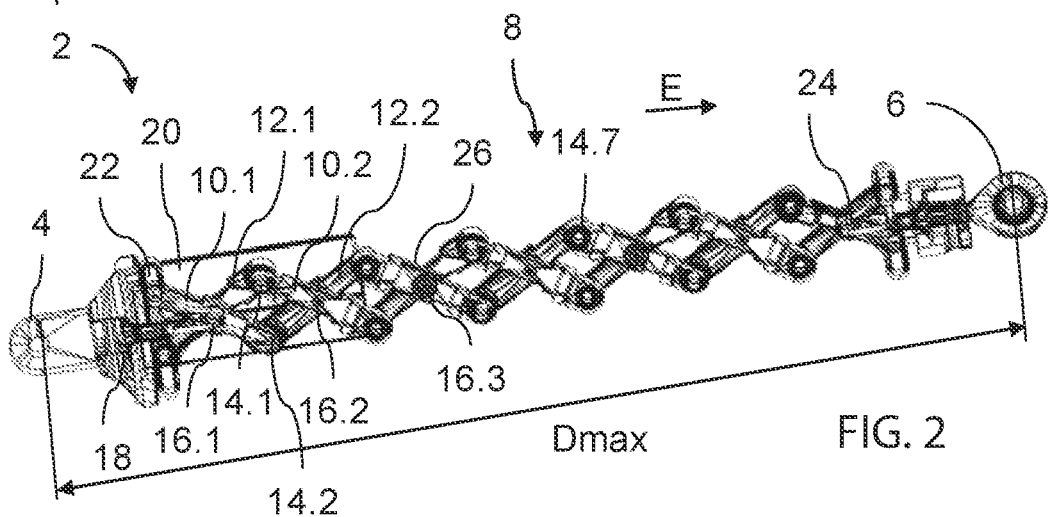
FIG. 2 shows a section through the displacement transducer arrangement from FIG. 1 in another perspective view.

FIG. 2 shows a section through the displacement transducer arrangement 2 in the position from FIG. 1.

In FIG. 2, the coupling of the scissor arms 10, 12 via the hinges 14 and center pins 16 can be seen. The designated center pin 16.1 is coupled with the wiper potentiometer 20, for example by a pin (not visible in FIG. 2) that is extended in this direction that actuates the wiper contact of the wiper potentiometer 20.

Figure 5:
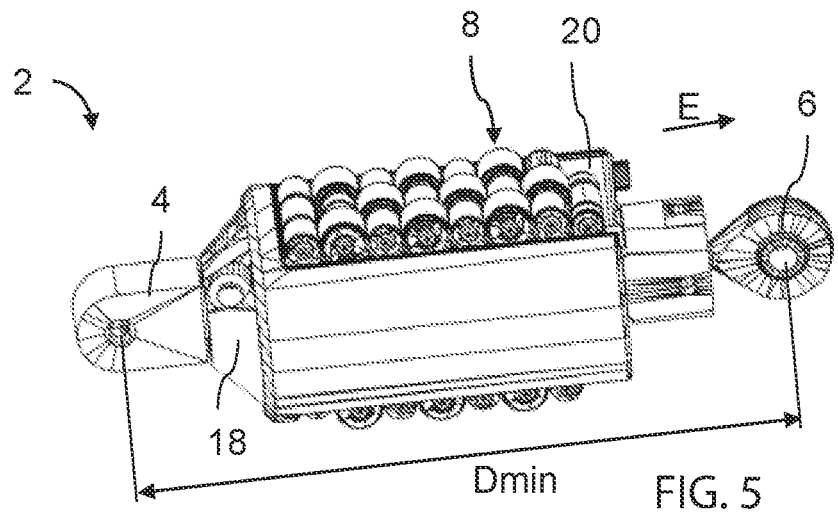
FIG. 5 shows a perspective view of the displacement transducer arrangement from FIG. 1 in the retracted position.
Figure 6:
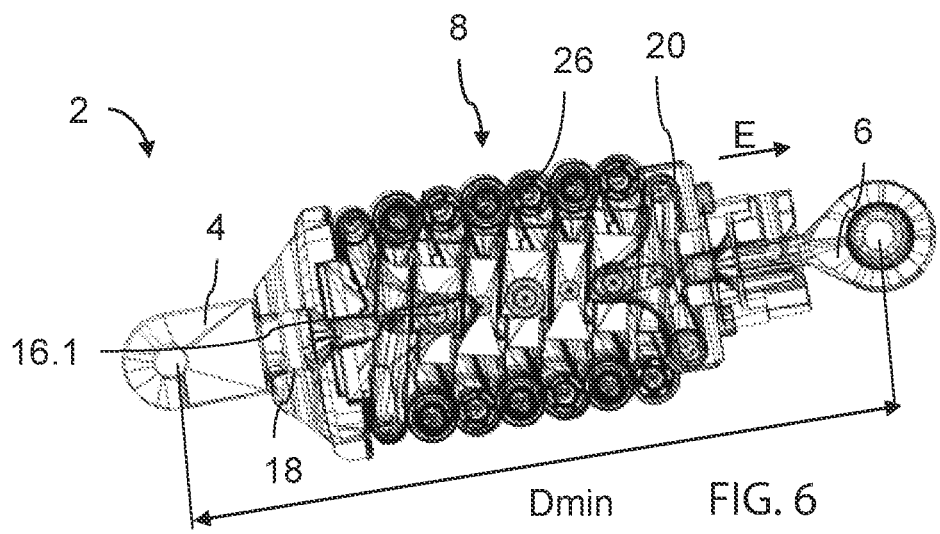
FIG. 6 shows a section through the displacement transducer arrangement according to FIG. 5 in a perspective view.

The scissor-jack mechanism is fastened by means of sliding members 22, 24 to first mounting 4 and second mounting 6. The sliding members 22, 24 are T-shaped, with slideways perpendicular to the direction of extension E and a slideway in the direction of extension E serving to guide the scissor arms 10, 12 and the center pins 16. Corresponding sliding members can be produced precisely and have a low-friction design. The low-friction, precise guiding of the scissor arms 10, 12 and center pins 16 can thus be ensured. The scissor arms 10, 10 have contact surfaces 26 that rest against one another in the completely retracted position (FIGS. 5, 6).

Figure 3:
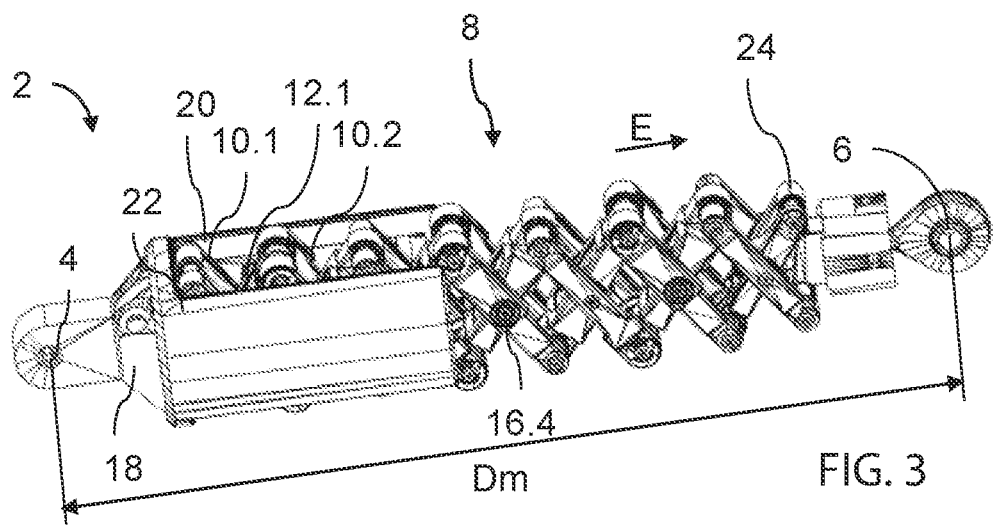
FIG. 3 shows a perspective representation of the displacement transducer arrangement from FIG. 1 in a middle position.

FIG. 3 shows the displacement transducer arrangement from FIGS. 1 and 2 in a middle position.

The position of the center pin 16.1, which is coupled with the wiper potentiometer 20, has changed analogously to the position of the scissor arms 10, 12, whereby another key value for the wiper potentiometer 20 is set which is representative of the current length Dm.

Figure 4:
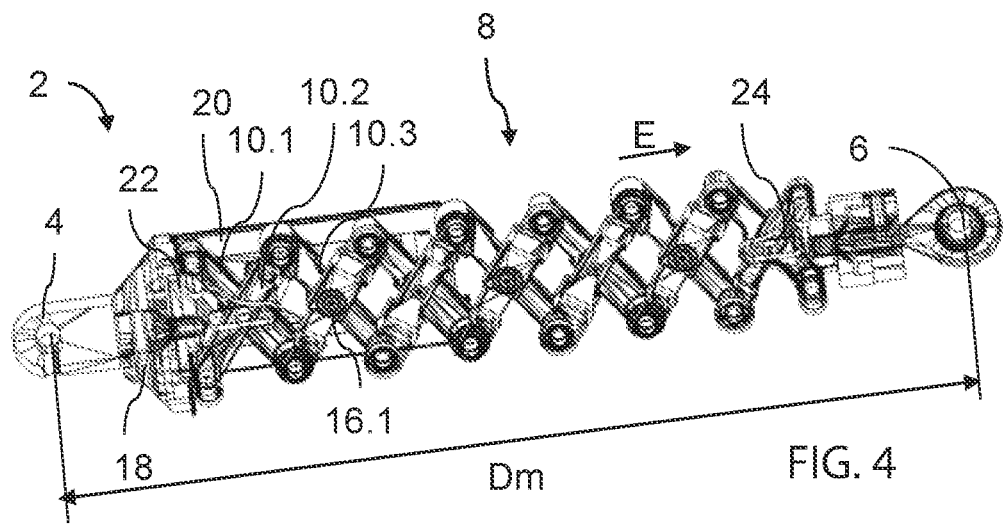
FIG. 4 shows a section through the displacement transducer arrangement according to FIG. 3 in a perspective view.

FIG. 4 shows a section through the displacement transducer arrangement in the position according to FIG. 3.

Here, the position of the center pin 16 relative to the wiper potentiometer 20 can be seen more clearly. In addition, the scissor arms 10, 12 have moved accordingly in the sliding members 22, 24.

FIG. 5 shows the displacement transducer arrangement 2 from FIGS. 1 and 4 in the completely retracted position.

The distance Dmin between first mounting 4 and second mounting 6 is minimal. In the depicted configuration, the displacement transducer arrangement 2 is especially compact and space-saving. The wiper potentiometer 20 and the collar 21 enclose the scissor-jack mechanism to a large extent. Only the hinges 14 protrude out.

FIG. 6 shows a section through the arrangement according to FIG. 5. The contact surfaces 26 rest against one another.

Figure 7:
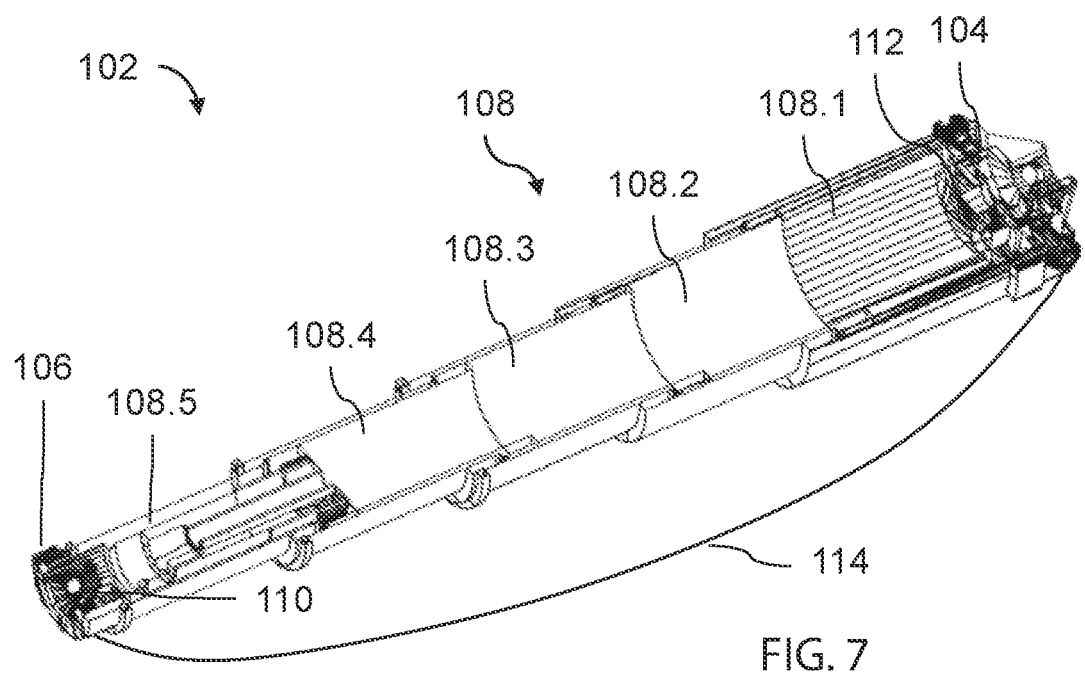
FIG. 7 shows a perspective view of a displacement transducer arrangement from the prior art.

FIG. 7 shows a displacement transducer arrangement 102 from the prior art.

In like manner, the displacement transducer arrangement 102 has a first mounting 104 and a second mounting 106. A sleeve arrangement 108 with several nested sleeves 108.1-108.5 extends between first mounting 104 and second mounting 106.

An infrared light-emitting diode (IR LED) 110 is arranged on the second mounting 106. An optical sensor 112 is arranged on the first mounting 4. The optical sensor 112 receives the light of the IR LED 110. Due to the light propagation of the IR LED 110, the luminance received is dependent on the distance between IR LED 110 and sensor 112. The light emitted by the IR LED 110 is partially reflected on the inner walls of the sleeves 108.1 to 108.5 and diverted to the sensor 112, so that the sleeve arrangement 108 has an influence on the luminance at the sensor 112. The relative position of the individual sleeves 108.1 to 108.5 is random, since the relative movement of the sleeves 108.1 to 108.5 is determined by the breakaway torque of the sleeves. As a result, one and the same distance D yields different configurations of the sleeve arrangement 108, which transport different luminances of the IR LED 110 to the sensor 112.

The LED 110 is supplied with power via a cable 114. LED 110 and sensor 112 require an adequate supply power.

Figure 8:
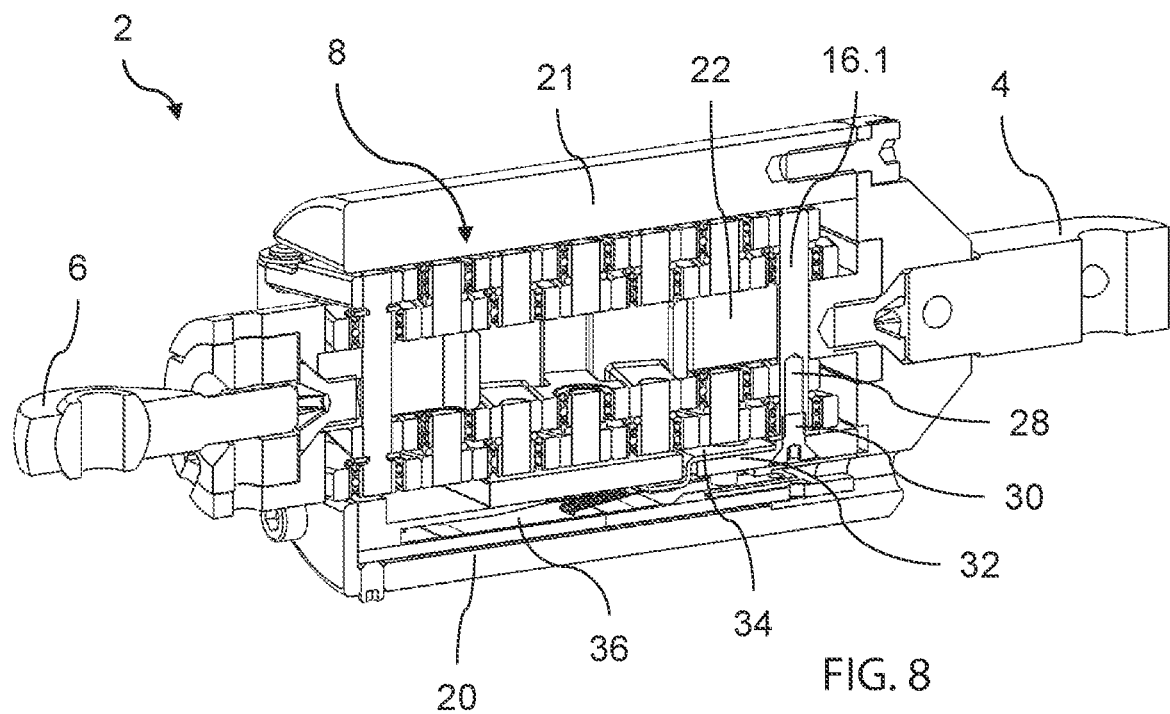
FIG. 8 shows a section through the displacement transducer arrangement from FIG. 6 with a depiction of the coupling with a potentiometer in a perspective view.

FIG. 8 shows a section through the displacement transducer arrangement from FIG. 6 with a depiction of the coupling of the center pin 16.1 with the wiper potentiometer 20 in a perspective view.

The center pin 16.1 has a hole 28 to which a carrier 32 is fixed by means of a screw 30. A wiper contact 34 is fastened to the carrier 32 that can be moved back and forth on a wiper plate 36.

The wiper potentiometer 20 can be wired as a voltage divider in a Wheatstone bridge.

Figure 9:
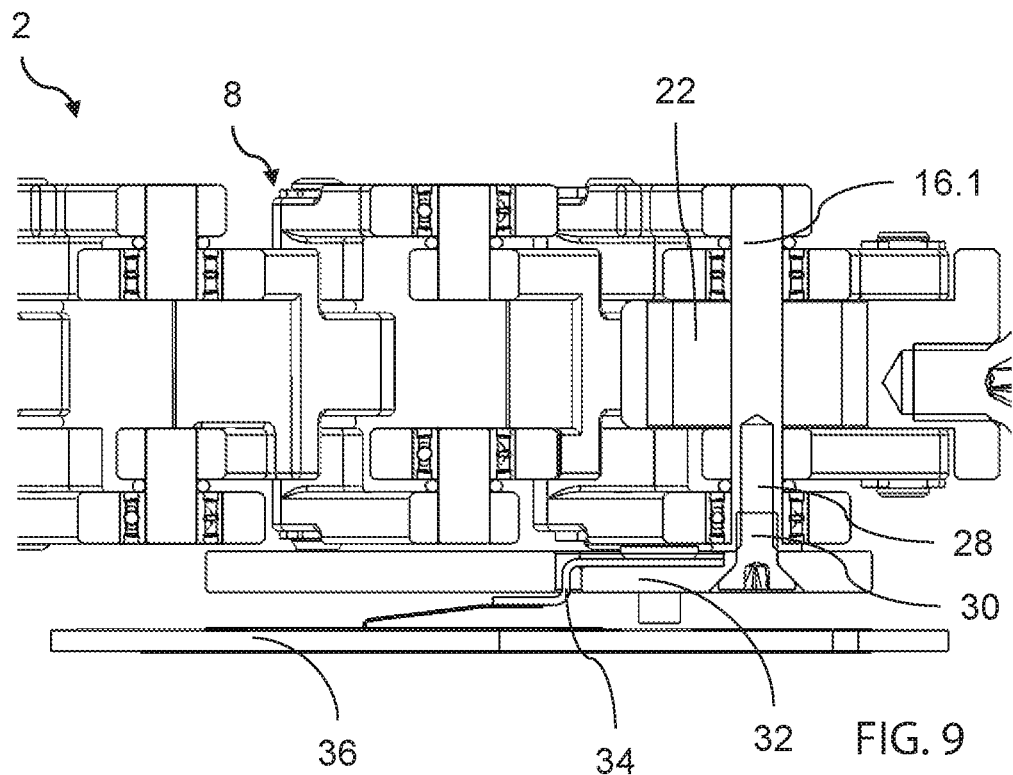
FIG. 9 shows a section through the displacement transducer arrangement from FIG. 6 with a depiction of the coupling with a potentiometer in a plan view.

FIG. 9 shows a section through the displacement transducer arrangement from FIG. 6 with a depiction of the coupling with a potentiometer in a plan view.

Figure 10:
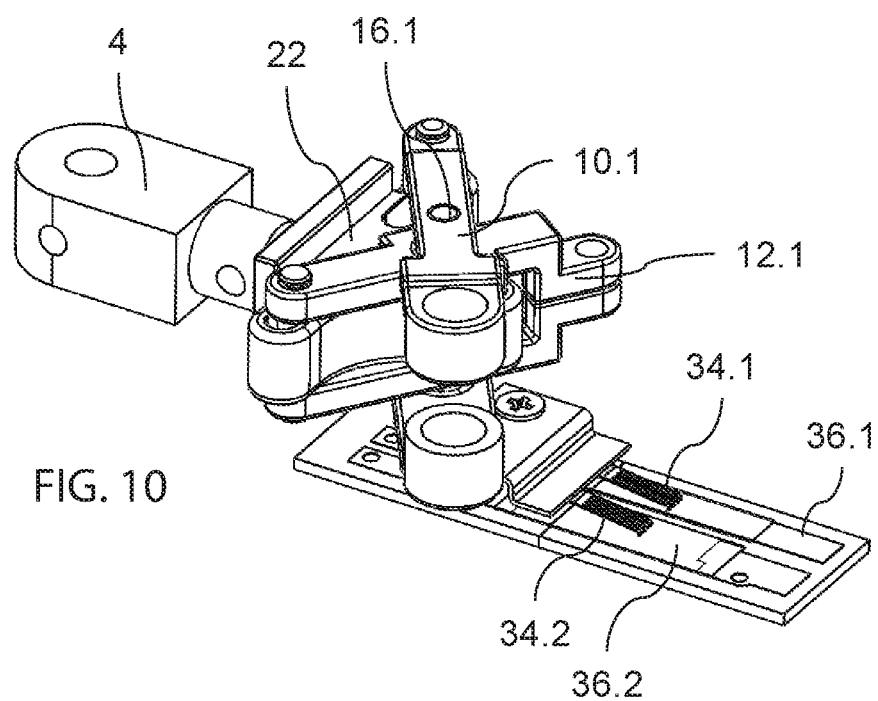
FIG. 10 shows an enlarged representation of the coupling between scissor-jack mechanism and potentiometer.

FIG. 10 shows an enlarged representation of the coupling between scissor-jack mechanism and potentiometer.

The wiper contact 34 has contacts 34.1, 34.2 that are moved conjointly on tracks 38.1, 38.2 of the wiper plate 36. This changes the resistance ratios substantially.

By measuring the bridge voltage of the Wheatstone bridge (not shown), every position of the contacts 34.1, 34.2 can be correlated with a specific measured value, e.g., a specific voltage. This enables the total length to be determined with a high level of precision through the previously performed calibration. The resolution of the system is very high, since the signal-to-noise ratio is high.

The measuring system with the wiper potentiometer 20 is also very fast, so that high speeds can be read out. Suitable known wiper potentiometers can resolve travel speeds of the contacts 34.1, 34.2 on the wiper plate 36 of up to 10 m/s; however, by virtue of the transmission by the scissor-jack mechanism, these speeds multiply in terms of the resolvable travel speeds of the displacement transducer arrangement 2.

In the depicted embodiment according to FIGS. 1 to 6, 8 to 10, theoretical measuring speeds of 140 m/s are possible. The multiplier depends on the specific design of the respective displacement transducer arrangement, particularly on the number and design of the scissor arms and of the center pin used to couple the scissor-jack mechanism with the potentiometer.

Figure 11:
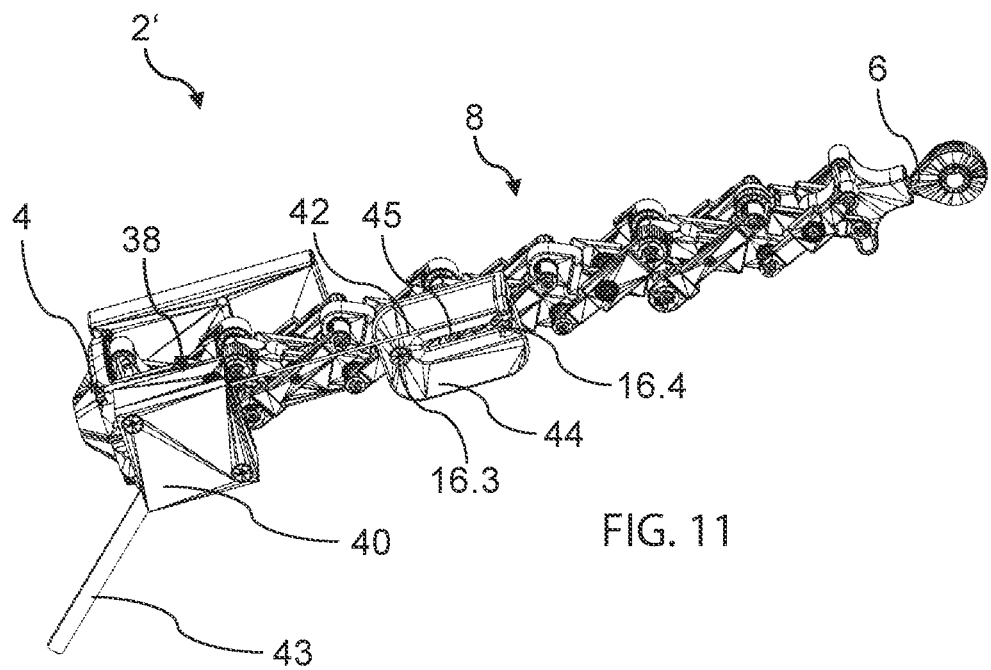
FIG. 11 shows a perspective representation of a second embodiment of a displacement transducer arrangement in the extended position.

FIG. 11 shows a perspective representation of a second embodiment of a displacement transducer arrangement 2' in the extended position.

Instead of a wiper potentiometer like in the previous exemplary embodiment, a string potentiometer 38 is provided on the displacement transducer arrangement 2'. The string potentiometer 38 has a base 40 and a cable 42. The base 40 is connected to a lead 43, which electrically contacts the string potentiometer 38.

The base 40 is arranged on the first mounting to the side of the scissor-jack mechanism 8. On its interior, the base 40 has a spring-biased winding mechanism for the cable 42 as well as a potentiometer, whose measurement value depends on the current position of the winding mechanism. The winding mechanism preloads the cable 42, so that the cable 42 has to be pulled out against the initial tension.

The cable 42 is fixed to a carrier 44. The carrier 44, in turn, is fixed to the center pin 16.3. Furthermore, the carrier 44 has a slotted hole 45 in which the center pin 16.4 is slidingly guided. As a result, the carrier 44 is always correctly positioned in relation to the scissor-jack mechanism 8.

A change in the distance between first mounting 4 and second mounting 6 brings about a movement of the center pin 16.3 relative to the first mounting 4. The stroke of the center pin 16.3 is proportional to the total stroke.

A reduction in the distance between first mounting 4 and second mounting 6, as occurs in the case of a chest intrusion in a crash test dummy, brings about a pushing-together of the scissor-jack mechanism 8. The winding mechanism catches up with the carrier 44 and the cable 42 that is fixed thereto, and the potentiometer measured value of the string potentiometer 38 changes accordingly.

Figure 12:
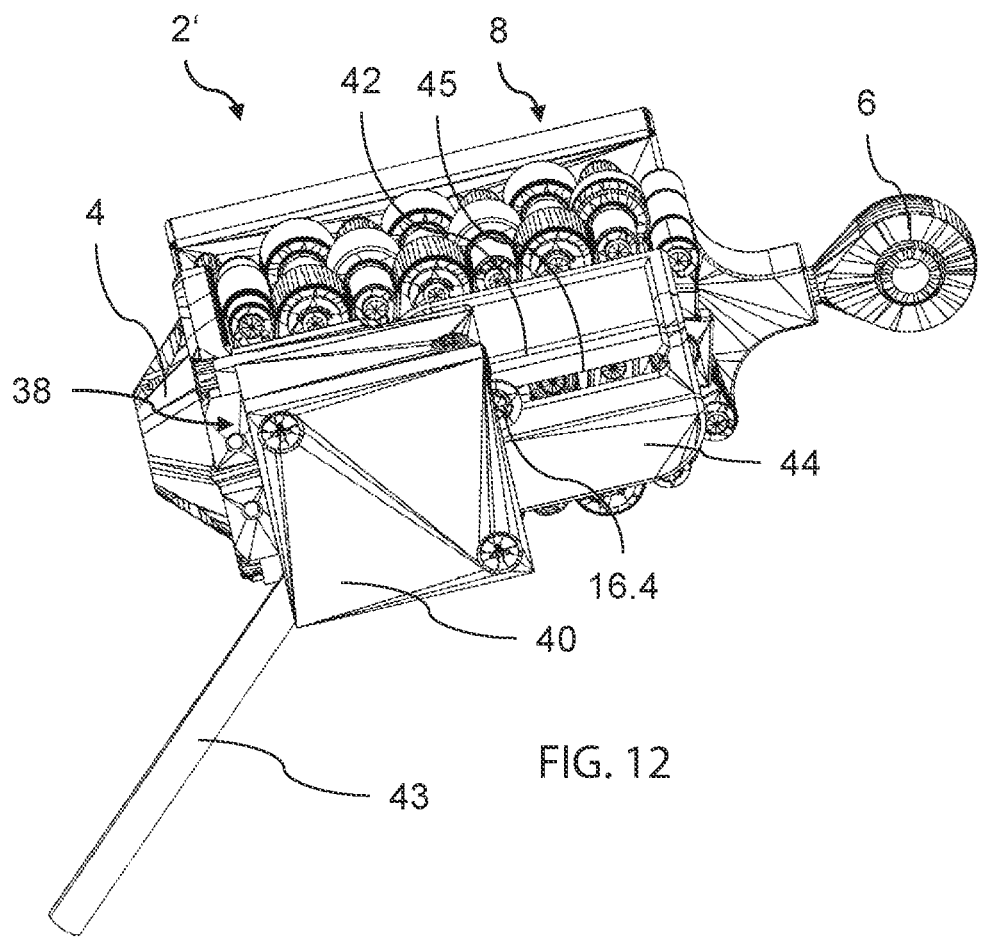
FIG. 12 shows the perspective view of the displacement transducer arrangement from FIG. 11 in the retracted position.

FIG. 12 shows a perspective view of the displacement transducer arrangement 2' from FIG. 11 in the retracted position.

In this position, the cable 42 is maximally retracted into the base 40.

The displacement transducer arrangement 2' is just as short as the displacement transducer arrangement 2 in the retracted position.

Figure 13:
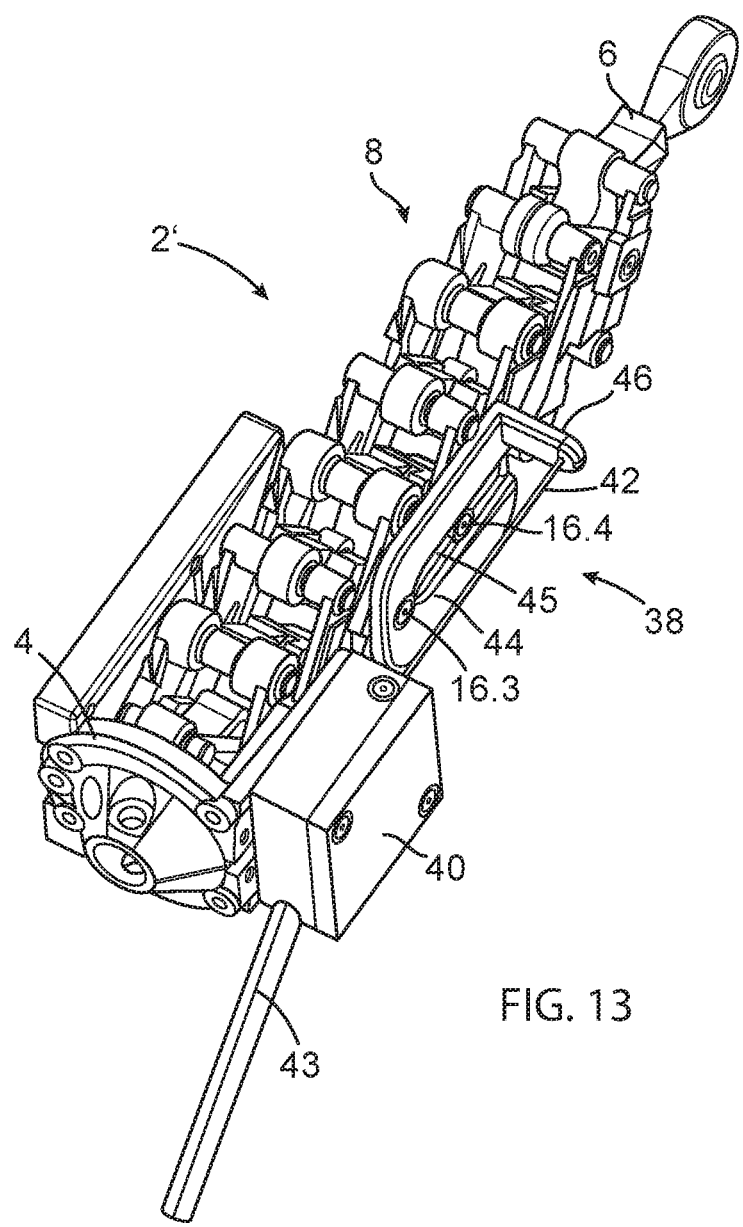
FIG. 13 shows a perspective view of the displacement transducer arrangement from FIG. 11 in the middle position.

FIG. 13 shows a perspective view of the displacement transducer arrangement from FIG. 11 in the middle position.

The cable 42 is arranged on the carrier 44 on a projection 46 in order to prevent the cable 42 from becoming wedged in the scissor-jack mechanism 8 at speeds that exceed the maximum draw-in speed of the winding mechanism. For this reason, the carrier 44 is flat and thus protects cable 42 and scissor-jack mechanism 8. The projection 46 can be a bolt, for example.

The invention claimed is:

1. A displacement transducer arrangement for measuring intrusions in a crash test dummy, having a first mounting and a second mounting, wherein a distance between the first mounting and the second mounting is variable, wherein there is a displacement transducer for measuring the distance (D) between the first mounting and second mounting, and wherein the first mounting and second mounting are connected to each other by a scissor-jack mechanism, wherein the displacement transducer is arranged in the direction of extension (E) between first mounting and second mounting to the side of the scissor-jack mechanism.

2. The displacement transducer arrangement according to claim 1, wherein the displacement transducer is embodied as a rotary potentiometer.

3. The displacement transducer arrangement according to claim 1, wherein the displacement transducer is embodied as a string potentiometer.

4. The displacement transducer arrangement according to claim 1, wherein the displacement transducer is embodied as a linear potentiometer.

5. The displacement transducer arrangement according to claim 4, wherein the linear potentiometer is a wiper potentiometer.

6. The displacement transducer arrangement according to claim 5, wherein a wiper contact of the linear potentiometer is connected in a nonpositive, frictional, or integral manner to the scissor-jack mechanism.

7. The displacement transducer arrangement according to claim 1, wherein the scissor-jack mechanism has a plurality of adjacently arranged scissor arms that can be folded in and out.

8. A crash test dummy, comprising:
at least one displacement transducer arrangement for measuring intrusions in the crash test dummy, having a first mounting and a second mounting, wherein a distance between the first mounting and the second mounting is variable, wherein there is a displacement transducer for measuring the distance (D) between the first mounting and second mounting, and wherein the first mounting and second mounting are connected to each other by a scissor-jack mechanism, wherein the displacement transducer is arranged in the direction of extension (E) between first mounting and second mounting to the side of the scissor-jack mechanism.

9. The displacement transducer arrangement according to claim 2, wherein the scissor-jack mechanism has a plurality of adjacently arranged scissor arms that can be folded in and out.

10. The displacement transducer arrangement according to claim 3, wherein the scissor-jack mechanism has a plurality of adjacently arranged scissor arms that can be folded in and out.

11. The displacement transducer arrangement according to claim 4, wherein the scissor-jack mechanism has a plurality of adjacently arranged scissor arms that can be folded in and out.

12. The displacement transducer arrangement according to claim 6, wherein the scissor-jack mechanism has a plurality of adjacently arranged scissor arms that can be folded in and out.

13. The displacement transducer arrangement according to claim 7, wherein the wherein the scissor arms have contact surfaces.

14. A displacement transducer arrangement for measuring intrusions in a crash test dummy, having a first mounting and a second mounting, wherein a distance between the first mounting and the second mounting is variable, wherein there is a displacement transducer for measuring the distance (D) between the first mounting and second mounting, and wherein the first mounting and second mounting are connected to each other by a scissor-jack mechanism, and wherein the displacement transducer is embodied as a linear potentiometer of the wiper potentiometer type.

15. The displacement transducer arrangement according to claim 14, wherein the displacement transducer is arranged in the direction of extension (E) between first mounting and second mounting to the side of the scissor-jack mechanism.

16. The displacement transducer arrangement according to claim 14, wherein a wiper contact of the linear potentiometer is connected in a nonpositive, frictional, or integral manner to the scissor-jack mechanism.

17. The displacement transducer arrangement according to claim 14, wherein the scissor-jack mechanism has a plurality of adjacently arranged scissor arms that can be folded in and out.

18. The displacement transducer arrangement according to claim 16, wherein the scissor-jack mechanism has a plurality of adjacently arranged scissor arms that can be folded in and out.

19. The displacement transducer arrangement according to claim 17, wherein the wherein the scissor arms have contact surfaces.

20. A crash test dummy, comprising:
at least one displacement transducer arrangement for measuring intrusions in the crash test dummy, having a first mounting and a second mounting, wherein a distance between the first mounting and the second mounting is variable, wherein there is a displacement transducer for measuring the distance (D) between the first mounting and second mounting, and wherein the first mounting and second mounting are connected to each other by a scissor-jack mechanism, and wherein the displacement transducer is embodied as a linear potentiometer of the wiper potentiometer type.

* * * * *